United States Patent
Lin

(10) Patent No.: US 7,666,794 B2
(45) Date of Patent: Feb. 23, 2010

(54) MULTIPLE PATTERNING USING PATTERNABLE LOW-K DIELECTRIC MATERIALS

(75) Inventor: Qinghuang Lin, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/029,848

(22) Filed: Feb. 12, 2008

(65) Prior Publication Data

US 2008/0150091 A1 Jun. 26, 2008

(51) Int. Cl.
*H01L 21/302* (2006.01)
*H01L 21/461* (2006.01)

(52) U.S. Cl. .................. 438/717; 438/758; 438/706; 438/671

(58) Field of Classification Search .......... 438/671, 438/725, 717, 723, 758, 736, 947, 925; 257/635, 257/E21.487, E23.002
See application file for complete search history.

(56) References Cited

U.S. PATENT DOCUMENTS

| | | | |
|---|---|---|---|
| 4,371,605 | A | 2/1983 | Renner |
| 5,886,102 | A | 3/1999 | Sinta et al. |
| 5,939,236 | A | 8/1999 | Pavelchek et al. |
| 6,087,064 | A | 7/2000 | Lin et al. |
| 6,566,019 | B2 | 5/2003 | Kling et al. |
| 6,787,469 | B2 | 9/2004 | Houston et al. |
| 6,861,180 | B2 | 3/2005 | Chang |
| 7,041,748 | B2 | 5/2006 | Lin et al. |
| 7,056,840 | B2 | 6/2006 | Miller et al. |
| 7,064,078 | B2 | 6/2006 | Liu et al. |
| 2004/0151489 | A1 | 8/2004 | Zhou |
| 2006/0058468 | A1* | 3/2006 | Wu et al. .......... 525/386 |
| 2006/0228895 | A1 | 10/2006 | Chae et al. |
| 2007/0003841 | A1 | 1/2007 | Choi |
| 2007/0020565 | A1 | 1/2007 | Koh et al. |
| 2007/0054198 | A1 | 3/2007 | Park |
| 2007/0148968 | A1 | 6/2007 | Kwon et al. |

(Continued)

FOREIGN PATENT DOCUMENTS

CA 1 204 547 2/1982

(Continued)

OTHER PUBLICATIONS

Owe-Yang, D.C., et al., Proc. SPIE, vol. 5753, Adv. Resist technology and Processing, p. 171-180, 2005.

*Primary Examiner*—Fernando L Toledo
*Assistant Examiner*—Mamadou Diallo
(74) *Attorney, Agent, or Firm*—Scully, Scott, Murphy & Presser, P.C.; Daniel P. Morris, Esq.

(57) ABSTRACT

A method of double patterning a semiconductor structure with a single material which after patterning becomes a permanent part of the semiconductor structure. More specifically, a method to form a patterned semiconductor structure with small features is provided which are difficult to obtain using conventional exposure lithographic processes. The method of the present invention includes the use of patternable low-k dielectric materials which after patterning remain as a low k dielectric material within the semiconductor structure. The method is useful in forming semiconductor interconnect structures in which the patternable low k dielectric materials after patterning and curing become a permanent element, e.g., a patterned interlayer low k dielectric material, of the interconnect structure.

25 Claims, 2 Drawing Sheets

U.S. PATENT DOCUMENTS

| | | |
|---|---|---|
| 2007/0212649 A1 | 9/2007 | Lalbahadoersing et al. |
| 2007/0248899 A1 | 10/2007 | Choi |
| 2007/0287101 A1* | 12/2007 | Kim et al. .................. 430/313 |
| 2008/0166638 A1* | 7/2008 | Jung et al. .................... 430/4 |
| 2008/0199814 A1* | 8/2008 | Brzozowy et al. ........... 430/312 |

FOREIGN PATENT DOCUMENTS

| | | |
|---|---|---|
| JP | 01-293339 | 11/1989 |

* cited by examiner

MULTIPLE PATTERNING USING PATTERNABLE LOW-K DIELECTRIC MATERIALS

FIELD OF THE INVENTION

The present invention relates to semiconductor device processing, and more particular to a method for multiple patterning of a semiconductor structure using patternable low dielectric constant dielectric materials as both a photoresist material and as a low k dielectric material of the semiconductor structure. Even more particularly, the present invention provides a method to pattern very small features that are not possible with a conventional single exposure lithographic process.

BACKGROUND OF THE INVENTION

Due to the increased demand for highly integrated semiconductor devices, techniques of integrating more semiconductor devices into a smaller area have become strongly relied upon. The integration of many semiconductor devices onto a small area includes downscaling the semiconductor devices to be formed on the semiconductor wafer. Moreover, as the integration density of semiconductor devices increases, the line width and spacing of circuit elements in the semiconductor devices must decrease accordingly.

In general, the electronic features of a semiconductor device are formed using patterns created by a photolithography process or processes. Patterns used to form circuit elements with spacing and/or line widths less than a predetermined minimum amount are referred to as "fine pitch" patterns. One of the main factors that determine the minimum pitch of patterns that can be formed by a photolithography process is the type light source used in the photolithography process. For example, conventional photolithography processes commonly use light sources such as krypton fluoride (KrF) or argon fluoride (ArF) lasers, which have respective wavelengths of 248 nm or 193 nm. Unfortunately, the resolution of these KrF or ArF lasers is not high enough to produce fine pitch patterns required in many semiconductor devices.

Because of this problem, the formation of fine pitch photoresist patterns is currently the subject of much research. One proposed method for forming fine pitch patterns is a double patterning method. Double patterning, or more generally, multiple patterning is a class of technologies developed for photolithography to enhance the feature density. In the semiconductor industry, double patterning may be used as early as the 65 nm mode and may be the primary technique for the 32 nm and beyond.

There are several types of double patterning technologies including, for example, double exposure/double etching. In such a technique, a first photoresist is first applied to a structure including, from top to bottom, a hard mask, an underlayer and a substrate. After applying the first photoresist to the structure, a first pattern is provided utilizing a conventional lithography step. Following patterning of the first photoresist, the first pattern is transferred to the hard mask utilizing a first etching step that stops on a surface of the underlayer. A second photoresist is then applied to the patterned structure and is exposed to a second patterning step. The second patterning step provides a second pattern into the second photoresist that lies between the first pattern provided in the first patterning and etching step. After second patterning, the second pattern formed in the second photoresist is transferred to the structure utilizing a second etching step. The second etching step removes exposed portions of the mask hard mask, while also stopping on the surface of the underlayer. The patterned second photoresist is then removed and thereafter the first and second patterns provided in the hard mask are transferred to the underlayer utilizing a third etching step.

One of the major problems with a conventional double exposure/double etching patterning process is the incompatibility of conventional resists. That is, during the double exposure/double etching process, the first photoresist dissolves during the formation of the second resist causes deformation of the first pattern.

Another problem with conventional double exposure/double etching is that such a technique requires complex processing including the use of two layers of resist and a hard mask. Additionally, many steps are required to deposit and remove the photoresists and hard mask employed in a conventional double exposure/double etching process.

In view of the above, there is a need for providing a new and improved multiple patterning process in which very small features can be formed.

SUMMARY OF THE INVENTION

The present invention provides a method of multiple patterning a semiconductor structure with a photo-patternable low dielectric constant (low-k) material which after patterning becomes a permanent part of the semiconductor structure. More specifically, the method of the present invention provides a method to form a patterned semiconductor structure with small features, which are difficult to obtain using conventional exposure lithographic processes. The method of the present invention includes the use of patternable low-k dielectric materials, which after patterning remain as a low k dielectric material within the semiconductor structure. The method of the present invention is useful in forming semiconductor interconnect structures in which the patternable low k dielectric materials after patterning and curing become a permanent element, e.g., a patterned interlayer low k dielectric material, of the interconnect structure.

In a first aspect of the invention, a method of forming a double patterned semiconductor structure is provided. The method of the invention generally comprises forming a first patternable low-k dielectric material above a surface of a material stack; patterning said first patternable low-k dielectric material to provide a first structure having a first patterned low-k dielectric material above said surface of said material stack; forming a second patternable low-k dielectric material over said first structure; patterning said second patternable low-k dielectric material to provide a second structure including a second patterned low-k dielectric material adjacent to, but not abutting the first patterned low-k dielectric material; curing at least the second patterned low-k dielectric material; and transferring patterns provided by said first and second patterned low-k dielectric materials into said material stack.

In one embodiment of the present invention, the material stack includes at least an inorganic antireflective coating and optionally a dielectric cap.

In another embodiment of the present invention, the inorganic antireflective coating is formed by vapor deposition and includes atoms of M, C and H, wherein M is at least one of Si, Ge, B, Sn, Fe, Ta, Ti, Ni, Hf and La and, optionally, one of O, N, S and F.

In a further embodiment of the present invention, the inorganic antireflective coating is formed by liquid deposition and comprises a polymer that has at least one monomer unit having the formula M-R$^1$, wherein M is at least one of Si, Ge, B, Sn, Fe, Ta, Ti, Ni, Hf and La and, optionally, one of O, N, S and F, and R is a chromophore.

In an even further embodiment of the present invention, the polymer of the liquid deposited antireflective coating further includes another monomer unit having the formula $M'-R^2$, wherein M' is at least one of Si, Ge, B, Sn, Fe, Ta, Ti, Ni, Hf and La and, optionally, one of O, N, S and F, and R is a cross-linking agent. In this embodiment, at least one of M and M' is further bonded to an organic ligand of C and H, a cross-linking component, a chromophore or mixtures thereof.

In still a further embodiment of the invention, the first and second patternable low-k dielectric materials are the same or different materials and are functionalized polymers having one or more irradiation/acid sensitive imageable groups. The functionalized polymers comprise polymers of a hydrocarbon, a fluorinated hydrocarbon, a siloxane, a silane, a carbosilane, an oxycarbosilane, an organosilicate or a silsesquioxane.

In yet still a further embodiment of the invention, at least one of the first and second patternable low-k dielectric materials further comprises a functionalized sacrificial pore generator which can be removed during subsequent processes forming a porous low k dielectric material.

As mentioned above, a curing step is performed that cures at least the second patterned low-k dielectric. In some instances, this curing step also cures the first patterned low k dielectric material. In yet another embodiment, the first patterned low-k dielectric is cured prior to forming the second patternable low k dielectric material. Notwithstanding which of these embodiments is performed, curing comprises a thermal cure, an electron beam cure, an UV cure, an ion beam cure, a plasma cure, a microwave cure or any combination thereof.

In some embodiment, small features that are permanent part of a semiconductor device are formed wherein the small features are formed by repeating the second patterning step mentioned above at least one more time.

In a second aspect of the present invention, a method of forming a double patterned semiconductor structure is provided that comprises: forming a first patternable low-k dielectric material above a surface of a material stack, said material stack including at least an inorganic antireflective coating; patterning and curing said first patternable low-k dielectric material to provide a first structure having a first patterned and cured low-k dielectric material above said surface of said material stack; forming a second patternable low-k dielectric material over said first structure; patterning said second patternable low-k dielectric material to provide a second structure including a second patterned low-k dielectric material adjacent to, but not abutting the first patterned and cured low-k dielectric material; curing the second patterned low-k dielectric material; and transferring patterns provided by said first and second patterned and cured low-k dielectric materials into at least said inorganic antireflective coating.

Many of the embodiments mentioned above for the first aspect of the present invention are also applicable herein for the second aspect of the invention as well.

In a third aspect of the present invention, a double patterned semiconductor structure is provided that comprises a first patterned and cured low-k dielectric material located on a portion of an antireflective coating; and a second patterned and cured low-k dielectric material located on another portion of said antireflective coating, wherein said second patterned and cured low-k dielectric material is adjacent to, but not abutting said first patterned and cured low-k dielectric material, wherein said inorganic antireflective coating is (i) a material having atoms of M, C and H, wherein M is at least one of Si, Ge, B, Sn, Fe, Ta, Ti, Ni, Hf and La, or (ii) a polymer that has at least one monomer unit having the formula $M-R^1$, wherein M is at least one of Si, Ge, B, Sn, Fe, Ta, Ti, Ni, Hf and La, and R is a chromophore.

In one embodiment of the invention, the inorganic antireflective coating is a polymer which further includes another monomer unit having the formula $M'-R^2$, wherein M' is at least one of Si, Ge, B, Sn, Fe, Ta, Ti, Ni, Hf and La and, optionally, one of O, N, S and F, and R is a cross-linking agent. In this embodiment of the invention, at least one of M and M' is further bonded to an organic ligand of C and H, a cross-linking component, a chromophore or mixtures thereof.

In another embodiment of the invention, the first and second cured and patternable low-k dielectric materials are the same or different dielectric material and are functionalized polymers having one or more irradiation/acid sensitive imageable groups. Functionalized polymers that can be employed as the patternable low-k dielectric material comprise polymers of a hydrocarbon, a fluorinated hydrocarbon, a siloxane, a silane, a carbosilane, an oxycarbosilane, an organosilicate or a silsesquioxane.

In yet another embodiment of the invention, at least one of the first and second cured and patterned low-k dielectric materials is porous.

In a further embodiment of the present invention, the first and second cured and patterned low-k dielectric materials of the inventive structure have a dielectric constant of not more than 4.3.

In an even further embodiment of the inventive double patterned semiconductor structure, the first and second cured and patterned low-k dielectric materials are separated by a distance of roughly half of the distance of similar features formed by a single exposure patterning.

DETAILED DESCRIPTION OF THE INVENTION

The present invention, which provides a method to pattern very small features into a semiconductor structure and the resultant patterned structure that is formed by the such a method, will now be described in greater detail by referring to the following discussion and drawings that accompany the present application. It is noted that the drawings that accompany the present application are provided for illustrative purposes only, and, as such, these drawings are not drawn to scale.

In the following description, numerous specific details are set forth, such as particular structures, components, materials, dimensions, processing steps and techniques, in order to provide a thorough understanding of the present invention. However, it will be appreciated by one of ordinary skill in the art that the invention may be practiced without these specific details. In other instances, well-known structures or processing steps have not been described in detail in order to avoid obscuring the invention.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present invention will now be described in reference to FIGS. 1A-1H which illustrate a preferred embodiment of the present invention in which a double patterned structure on a semiconductor chip is formed.

Figure 1A:
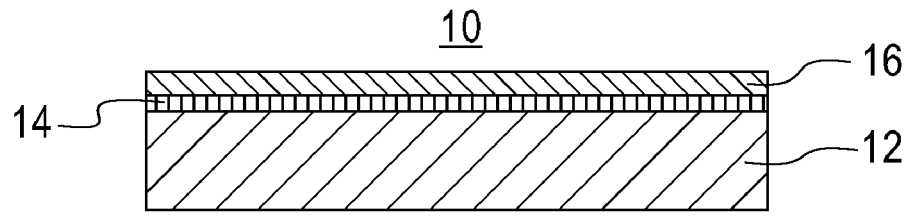
FIGS. 1A-1H are pictorial representations (through cross sectional views) depicting basic processing steps that are employed in the present invention to provide a multiple patterned structure on a semiconductor chip.

FIG. 1A illustrates an initial structure 10 that is utilized in this embodiment of the present invention. The initial structure 10 includes a substrate 12, an optional dielectric cap 14 located on a surface of substrate 12, and inorganic antireflective coating 16 located on a surface of the optional dielectric cap 14.

The substrate 12 may comprise a semiconducting material, an insulating material, a conductive material or any combination thereof (e.g., a lower level of an interconnect structure). When the substrate 12 is comprised of a semiconducting material, any semiconductor such as Si, SiGe, SiGeC, SiC, Ge alloys, GaAs, InAs, InP, other III/V or II/VI compound semiconductors, and organic semiconductors may be used. In addition to these listed types of semiconducting materials, the present invention also contemplates cases in which the semiconductor substrate is a layered semiconductor such as, for example, Si/SiGe, Si/SiC, silicon-on-insulators (SOIs) or silicon germanium-on-insulators (SGOIs).

When the substrate 12 is an insulating material, the insulating material can be an organic insulator, an inorganic insulator or a combination thereof including multilayers. The substrate 12 may also include a patternable low-k dielectric material of this invention as well. When the substrate 12 is a conducting material, the substrate may include, for example, polySi, an elemental metal, alloys of elemental metals, a metal silicide, a metal nitride, conductive nanotubes and nanowires or combinations thereof including multilayers. When the substrate 12 comprises a semiconducting material, one or more semiconductor devices such as, for example, complementary metal oxide semiconductor (CMOS) devices can be fabricated thereon.

The optional dielectric cap 14 is formed on the surface of substrate 12 utilizing a conventional deposition process such as, for example, chemical vapor deposition (CVD), plasma enhanced chemical vapor deposition (PECVD), atomic layer deposition (ALD), spin coating, brush coating, spray coating, dip coating, or evaporation. The dielectric cap 14 comprises any suitable dielectric capping material such as, for example, SiC, SiN, $SiO_2$, a carbon doped oxide, a nitrogen and hydrogen doped silicon carbide SiC(N,H) or multilayers thereof. This dielectric cap can be a continuous layer or a discontinuous layer. It can also be a select cap, such as CoWP. The thickness of the dielectric cap 14 may vary depending on the technique used to form the same as well as the material make-up of the layer. Typically, the dielectric cap 14 has a thickness from about 15 to about 55 nm, with a thickness from about 25 to about 45 nm being more typical.

Next, an inorganic antireflective coating (ARC) 16 is formed on a surface of the optional dielectric cap 14 if present, or directly on a surface of the substrate 12 when the dielectric cap 14 is not present. The ARC 16 may be designed to control reflection of light that is transmitted through the patternable low-k film (to be subsequently formed), reflected off the substrate and back into the patternable low-k film, where it can interfere with incoming light and cause the low-k film to be unevenly exposed. The ARC's optical constants are defined here as the index of refraction n and the extinction coefficient k. In general, ARC 16 can be modeled so as to find optimum optical parameters (n and k values) of ARC as well as optimum thickness. The preferred optical constants of the ARC 16 are in the range from about n=1.4 to n=2.6 and k=0.01 to k=0.78 at a wavelength of 248, 193 and 157, 126 nm and extreme ultraviolet (13.4 nm) radiation.

The optical properties and thickness of ARC 16 is optimized to obtain optimal resolution and profile control of the patternable low-k material during the subsequent patterning steps, which is well known to those ordinarily skilled in the art. The thickness of the ARC 16 may vary depending on the technique used to form the same as well as the material make-up of the layer. Typically, the ARC 16 has a thickness from about 5 to about 200 nm, with a thickness from about 20 to about 140 nm being more typical.

In one embodiment of the present invention, the ARC 16 of the present invention is a composition that includes atoms of M, C and H, wherein M is at least one of Si, Ge, B, Sn, Fe, Ta, Ti, Ni, Hf and La. This inorganic ARC may optionally include atoms of O, N, S, F or mixtures thereof. In some embodiments, M is preferably Si. The ARC composition may also be referred to as a vapor deposited M:C:H optionally X material, wherein M and X are as defined above.

In the above embodiment, the ARC 16 is produced by a vapor deposition (such as, for example, CVD, PECVD PVD and ALD) method using appropriate Si, Ge, B, Sn, Fe, Ta, Ti, Ni, Hf and La precursors by adjusting process parameters and/or precursor composition. In the case of Si:C:H:X films, these are deposited from methylsilanes with/without additions of nitrogen and/or oxygen and/or fluorine and/or sulfur containing precursors.

Other precursors are also contemplated in the present invention besides methylsilanes. Typically, any precursor including M, C and H can be used in the present invention. That is, any precursor including M and at least one organic ligand can be used. Examples include methylsilanes such as trimethylsilane or tetramethylsilane, siloxanes such as tetramethylcylcotetrasiloxane or octylmethylcyclotetrasiloxane, or methyl gemanes such as trimethylgermane or tetraethylgermane.

Other organic precursors may also be used in the present invention, in addition to the organometallic ones, to tune optical, electrical, mechanical properties of the ARC 16 and/or the film stack. These organic precursors are selected from hydrocarbons and their derivatives, including linear, branched, and ring type molecules.

The atomic % ranges for M are the following: preferably about 0.1 atomic % to about 95 atomic %, more preferably about 0.5 atomic % to about 95 atomic %, most preferably about 1 atomic % to about 60 atomic % and most highly preferably about 5 atomic % to about 50 atomic %.

The atomic % ranges for C are the following: preferably about 0.1 atomic % to about 95 atomic %, more preferably about 0.5 atomic % to about 95 atomic %, most preferably about 1 atomic % to 60 atomic % and most highly preferably about 5 atomic % to 50 atomic %.

The atomic % ranges for H are the following: preferably about 0.1 atomic % to about 50 atomic %, more preferably about 0.5 atomic % to about 50 atomic %, most preferably about 1 atomic % to about 40 atomic % and most highly preferably about 5 atomic % to about 30 atomic %.

The atomic % ranges for X are the following: preferably 0 atomic % to about 70 atomic %, more preferably about 0.5 atomic % to about 70 atomic %, most preferably about 1 atomic % to about 40 atomic % and most highly preferably about 5 atomic % to about 30 atomic %.

The ARC 16 produced by the present invention has a tunable index of refraction and extinction coefficient which can be optionally graded along the film thickness to match the optical properties of the substrate and the patternable low-k material. The optical properties at DUV and the lithographic features of the ARC produced by the present invention are vastly superior to those obtained by other hardmask materials such as oxide type materials (TEOS, BSG) and nitride type materials.

In one preferred embodiment, the ARC 16 of the present invention is formed by plasma enhanced chemical vapor deposition (PECVD) techniques. In one type of technique, the PECVD process is performed in a parallel plate reactor where the substrate is placed on one of the electrodes.

The following are a list of non-limiting exemplary embodiments in which the ARC is deposited on a substrate that is positioned on a powered electrode and therefore a negative bias is required:

In one embodiment, a Si:C:H film is deposited under the following conditions: precursor=tetramethylsilane at a flow of 10 sccm, pressure in reactor=200 mtorr, substrate temperature=60° C., substrate bias=−200 V.

In a second embodiment, a Si:C:O:H film is deposited under the following conditions: precursor=tetramethylsilane at a flow of 10 sccm mixed with oxygen at a flow of 2 sccm, pressure in reactor=200 mtorr, substrate temperature=180° C., substrate bias=−200 V.

In a third embodiment, a Si:C:H film is deposited under the following conditions: precursor=trimethylsilane at a flow of 10 sccm, pressure in reactor=200 mtorr, substrate temperature=60° C., substrate bias=−200 V.

In a fourth embodiment, a Si:C:O:H film is deposited under the following conditions: precursor=trimethylsilane at a flow of 10 sccm mixed with oxygen at a flow of 2 sccm, pressure in reactor=200 mtorr, substrate temperature=60° C., substrate bias=−200 V.

In a fifth embodiment, a Si:C:O:H film is deposited under the following conditions: precursor=tetramethyltetrasiloxane with argon as a carrier gas at flow of 30 sccm, pressure in reactor=250 mtorr, substrate temperature=60° C., substrate bias=−150 V.

In a sixth embodiment, a Si:C:O:H film is deposited under the following conditions: precursor=tetramethyltetrasiloxane with argon as a carrier gas at flow of 30 sccm, pressure in reactor=250 mtorr, substrate temperature=180° C., substrate bias=−200 V.

In a seventh embodiment, a Si:C:O:H film is deposited under the following conditions: precursor=tetramethyltetrasiloxane with argon as a carrier gas at flow of 30 sccm, pressure in reactor=200 mtorr, substrate temperature=180°, substrate bias=−200 V.

In an eighth embodiment, a Ge:C:H film is deposited under the following conditions: precursor=tetramethylgermane with argon as a carrier gas at flow of 30 sccm, pressure in reactor=50 mtorr, substrate temperature=180° C., substrate bias=−250 V.

In a ninth embodiment, a Ge:C:H film is deposited under the following conditions: precursor=tetramethylgermane with argon as a carrier gas at flow of 30 sccm, pressure in reactor=100 mtorr, substrate temperature=60° C., substrate bias=−50 V.

In a tenth embodiment, a Ge:C:H:O film is deposited under the following conditions: precursor=tetramethylgermane at a flow of 15 seem mixed with oxygen at a flow of 2 scam, pressure in reactor=200 mtorr, substrate temperature=60° C., substrate bias=−50 V.

The ARC 16 can be deposited also in a parallel plate PECVD reactor with the substrate positioned on the grounded electrode. It can be deposited in conditions similar to those described in the previous examples but at substrate temperatures up to 400° C., and in high-density plasma type reactors under suitable chosen conditions.

It should be noted that by changing process parameters during vapor deposition such as bias voltage, gas mixture, gas flow, pressure and deposition temperature, the film optical constants can be changed. In addition, the composition of the starting precursor used during vapor deposition as well as the introduction of oxygen, nitrogen, fluorine, sulfur-containing precursors also allows the tunability of these films.

In another embodiment of the present invention, ARC 16 is formed by a liquid deposition process including for example, spin-on coating, spray coating, dip coating, brush coating, evaporation or chemical solution deposition. This ARC formed by liquid deposition comprises a polymer that has at least one monomer unit comprising the formula $M-R^1$ wherein M is at least one of Si, Ge, B, Sn, Fe, Ta, Ti, Ni, Hf and La and $R^1$ is a chromophore. In some embodiments, M within the monomer unit may also be bonded to organic ligands including atoms of C and H, a cross-linking component, another chromophore or mixtures thereof. The organic ligands may further include one of O, N, S and F. When the organic ligand is bonded to M, it is bonded to M through C, O, N, S, or F.

In other embodiments of the present invention, the ARC formed by liquid deposition may also include at least one second monomer unit, in addition to the at least one monomer unit represented by the formula $M-R^1$. When present, the at least one second monomer unit has the formula $M'-R^2$, wherein M' is at least one of Si, Ge, B, Sn, Fe, Ta, Ti, Ni, Hf and La, and $R^2$ is a cross-linking agent. M and M' may be the same or different elements. In these two formulae, M and M' within the monomer unit may be also be bonded to organic ligands including atoms of C and H, a cross-linking component, a chromophore or mixtures thereof. The organic ligands may further include one of O, N, S and F. When the organic ligand is bonded to M and M', it is bonded to M or M' through C, O, N, S, or F.

The liquid ARC composition comprising $M-R^1$ or $M-R^1$ and $M'-R^2$ may also comprise at least one additional component, including a separate crosslinker, an acid generator or a solvent.

When liquid deposition is employed, the ARC 16 is formed by liquid phase deposition of a liquid composition that includes an inorganic precursor that includes atoms of M, C and H, wherein M is at least one of Si, Ge, B, Sn, Fe, Ta, Ti, Ni, Hf and La. The inorganic precursor used in forming the ARC may optionally include atoms of O, N, S, F or mixtures thereof. In some embodiments, M is preferably Si. The liquid composition also includes, in addition to the inorganic precursor, a chromophore, a cross-linking component and an acid generator.

One embodiment of the inorganic ARC composition used in the liquid deposition embodiment comprises $M-R^1$ and $M'-R^2$ units, wherein M and M' is at least one of Si, Ge, B, Sn, Fe, Ta, Ti, Ni, Hf and La or is selected from Group IIIB to Group VIB, Group IIIA, Group IVA. The inorganic precursor used in forming the ARC may optionally include atoms of O, N, S, F or mixtures thereof. One embodiment of inventive inorganic ARC composition comprises the $MO_y$ unit which can be any one of many different metal-oxide forms. An exemplary list of such metal-oxide forms for a particular metal is as follows:

$MO_3$; wherein M is Sc, Y, lanthanide, and Group IIIA; B, Al, Ga or In.

$MO_4$; wherein M is Group IVB; Ti, Zr or Hf, and Group IVA; Sn or Ge.

MO$_5$; wherein M is Group VB; V, Nb or Ta; or P. The Group VB metals are also known to form stable metal oxo forms, LMO3, wherein L is an oxo.

LMO; many of the listed metals form stable acetoacetato-metal complexes.

LMO; many of the listed metals form stable cyclopentadienyl-metal complexes.

LMO; wherein L is an alkoxy ligand; M is Sc, Y, or lanthanide, Group IVB, and Group VB.

LMO; wherein L is an alkyl or phenyl ligand; M is Group IIIA or Group IVA.

The chromophore, cross-linking component and acid generator that can be used in the present invention are defined in greater detail with respect to the following preferred embodiment of the present invention.

In a preferred embodiment, the ARC 16 formed by liquid deposition is characterized by the presence of an SiO-containing polymer having pendant chromophore moieties. The polymer containing SiO moieties may be a polymer containing SiO moieties in the polymer backbone and/or in pendant groups. Preferably, the polymer contains SiO moieties in its backbone. The polymer is preferably a siloxane, a silane, a carbosilane, an oxycarbosilane, an organosilicate, a silsesquioxane, or an organosiloxane, more preferably organosilsesquioxane. The polymer should have solution and film-forming characteristics conducive to forming a layer by conventional spin-coating. In addition to the chromophore moieties discussed below, the SiO-containing polymer also preferably contains a plurality of reactive sites distributed along the polymer for reaction with the cross-linking component.

Examples of suitable polymers include polymers having the silsesquioxane (ladder or network) structure. Such polymers preferably contain monomers having structures (I) and (II) below:

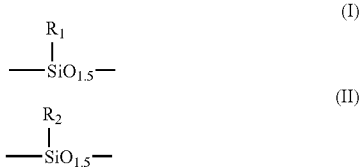

where $R_1$ comprises a chromophore and $R_2$ comprises a reactive site for reaction with the cross-linking component.

Alternatively, general linear organosiloxane polymers containing monomers (III) and (IV) can be used:

where $R_1$ and $R_2$ are as described above. In some cases, the polymer contains various combinations of monomers (I)-(IV) such that the average structure for $R_1$-containing monomers may be represented as structure (V) below and the average structure for $R_2$-containing monomers may be represented by structure (VI) below:

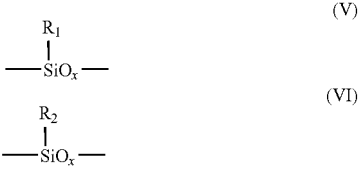

where x is from about 1 to about 1.5. In theory, x may be greater than 1.5, however, such composition generally do not possess characteristics suitable for spin-coating processes (e.g., they form undesirable gel or precipitate phases).

Generally, silsesquioxane polymers are preferred. If the ordinary organosiloxane polymers are used (e.g., monomers of structures (III) and (IV)), then preferably, the degree of cross-linking is increased compared to formulations based on silsesquioxanes.

The chromophore-containing groups $R_1$ (or $R^1$ in the generic description above) may contain any suitable chromophore which (i) can be grafted onto the SiO-containing polymer (or M moiety of the generic monomer defined above) (ii) has suitable radiation absorption characteristics at the imaging wavelength, and (iii) does not adversely affect the performance of the layer or any overlying layers.

Preferred chromophore moieties include benzene and its derivatives, chrysenes, pyrenes, fluoranthrenes, anthrones, benzophenones, thioxanthones, and anthracenes. Anthracene derivatives, such as those described in U.S. Pat. No. 4,371,605 may also be used; the disclosure of this patent is incorporated herein by reference. In one embodiment, phenol, hydroxystyrene, and 9-anthracene methanol are preferred chromophores. The chromophore moiety preferably does not contain nitrogen, except for possibly deactivated amino nitrogen such as in phenol thiazine.

The chromophore moieties may be chemically attached by acid-catalyzed O-alkylation or C-alkylation such as by Friedel-Crafts alkylation. The chromophore moieties may also be chemically attached by hydrosilylation of SiH bond on the parent polymer. Alternatively, the chromophore moiety may be attached by an esterification mechanism. A preferred acid for Friedel-Crafts catalysis is HCl.

Preferably, about 15 to about 40% of the functional groups contain chromophore moieties. In some instances, it may be possible to bond the chromophore to the monomer before formation of the SiQ-containing polymer. The site for attachment of the chromophore is preferably an aromatic group such as a hydroxybenzyl or hydroxymethylbenzyl group. Alternatively, the chromophore may be attached by reaction with other moieties such as cyclohexanol or other alcohols. The reaction to attach the chromophore is preferably an esterification of the alcoholic OH group.

$R_2$ (or $R^2$ in the generic description above) comprises a reactive site for reaction with the cross-linking component. Preferred reactive moieties contained in $R_2$ are alcohols, more preferably aromatic alcohols (e.g., hydroxybenzyl, phenol, hydroxymethylbenzyl, etc.) or cycloaliphatic alcohols (e.g., cyclohexanoyl). Alternatively, non-cyclic alcohols such as fluorocarbon alcohols, aliphatic alcohols, amino groups, vinyl ethers, and epoxides may be used.

Preferably, the SiO-containing polymer (before attachment of the chromophore) is poly(4-hydroxybenzylsilsesquioxane). Examples of other silsesquioxane polymers of the invention include: poly(p-hydroxyphenylethylsilsesquioxane), poly(p-hydroxyhenylethylsilsesquioxane-co-p-hydroxy-alpha-metylbenzylsilsesquioxane), poly(p-hydroxyphenylethysilsesquioxane-co-methoxybenzylsilsesquioxane), poly(p-hydroxyphenylethylsilsesquioxane-co-t-butylsilsesquioxane), poly(p-hydroxyphenylethylsilsesquioxane-co-cyclohexylsilsesquioxane), poly(p-hydroxyphenylethylsilsesquioxane-co-phenylsilsesquioxane), poly(p-hydroxyphenylethylsilsesquioxane-co-bicycloheptylsilsesquioxane), poly(p-hydroxy-alpha-methylbenzylsilsesquioxane), poly(p-hydroxy-alpha-methylbenzylsilsesquioxane-co-p-hydroxybenzylsilsesquioxane), poly(p-hydroxy-alpha-methylbenzylsilsesquioxane-co-methoxybenzylsilsesquioxane), poly(p-hydroxy-alpha-methylbenzylsilsesquioxane-co-t-butylsilsesquioxane), poly(p-hydroxy-alpha-methylbenzylsilsesquioxane-co-cyclohexylsilsesquioxane), poly(p-hydroxy-alpha-methylbenzylsilsesquioxane-co-phenylsilsesquioxane), poly(p-hydroxy-alpha-methylbenzylsilsesquioxane-co-bicycloheptylsilsesquioxane), poly(p-hydroxybenzylsilsesquioxane-co-p-hydroxyphenylethylsilsesquioxane), and poly(p-hydroxy-alpha-methylbenzylsilsesquioxane-co-alpha-methylbenzylsilsesquioxane).

The SiO-containing polymers of the invention preferably have a weight average molecular weight, before reaction with the cross-linking component, of at least about 1000, more preferably a weight average molecular weight of about 1000-10000.

The cross-linking component is preferably a crosslinker that can be reacted with the SiO containing polymer in a manner which is catalyzed by generated acid and/or by heating. Generally, the cross-linking component used in the antireflective compositions of the invention may be any suitable cross-linking agent known in the negative photoresist art which is otherwise compatible with the other selected components of the composition. The cross-linking agents preferably act to crosslink the polymer component in the presence of a generated acid. Preferred cross-linking agents are glycoluril compounds such as tetramethoxymethyl glycoluril, methylpropyltetramethoxymethyl glycoluril, and methylphenyltetramethoxymethyl glycoluril, available under the POWDERLINK trademark from American Cyanamid Company. Other possible cross-linking agents include: 2,6-bis(hydroxymethyl)-p-cresol, compounds having the following structures:

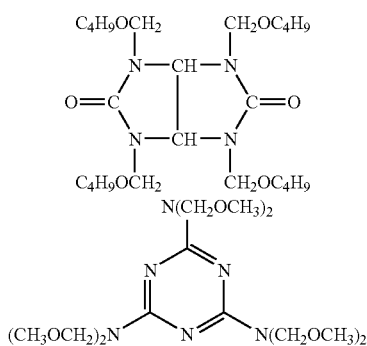

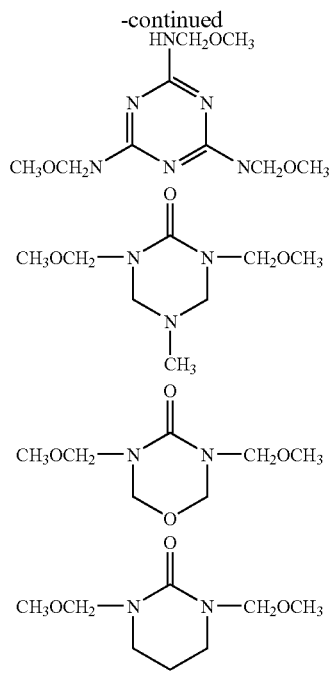

including their analogs and derivatives, such as those found in Japanese Laid-Open Patent Application (Kokai) No. 1-293339, as well as etherified amino resins, for example methylated or butylated melamine resins (N-methoxymethyl- or N-butoxymethyl-melamine respectively) or methylated/butylated glycolurils, for example as can be found in Canadian Patent No. 1 204 547. Other cross-linking agents such as bis-epoxies or bis-phenols (e.g., bisphenol-A) may also be used. Combinations of cross-linking agents may be used.

The acid generator is preferably an acid generator compound that liberates acid upon thermal treatment. A variety of known thermal acid generators are suitably employed such as, for example, 2,4,4,6-tetrabromocyclohexadienone, benzoin tosylate, 2-nitrobenzyl tosylate and other alkyl esters of organic sulfonic acids, blocked alkyl phosphoric acids, blocked perfluoroalkyl sulfonic acids, alkyl phosphoric acid/amine complexes, perfluoroalkyl acid quats wherein the blocking can be by covalent bonds, amine and quaternary ammonium. Compounds that generate a sulfonic acid upon activation are generally suitable. Other suitable thermally activated acid generators are described in U.S. Pat. Nos. 5,886,102 and 5,939,236; the disclosures of these two patents are incorporated herein by reference. If desired, a radiation-sensitive acid generator may be employed as an alternative to a thermally activated acid generator or in combination with a thermally activated acid generator. Examples of suitable radiation-sensitive acid generators are described in U.S. Pat. Nos. 5,886,102 and 5,939,236. Other radiation-sensitive acid generators known in the resist art may also be used as long as they are compatible with the other components of the antireflective composition. Where a radiation-sensitive acid generator is used, the cure (cross-lining) temperature of the composition may be reduced by application of appropriate radiation to induce acid generation which in turn catalyzes the cross-linking reaction. Even if a radiation-sensitive acid generator is used, it is preferred to thermally treat the composition to accelerate the cross-linking process (e.g., for wafers in a production line).

The antireflective compositions used in the liquid deposition process preferably contain (on a solids basis) (i) from about 50 to about 98 wt. % of a polymer including M, more preferably from about 70 to about 80 wt. %, (ii) from about 1 to about 50 wt. % of cross-linking component, more preferably from about 3 to about 25%, most preferably about from about 5 to about 25 wt. %, and (iii) from about 1 to about 20 wt. % acid generator, more preferably about 1-15 wt. %.

When ARC 16 is formed by liquid deposition process any liquid deposition process including for example, spin-on coating, spray coating, dip coating, brush coating, evaporation or chemical solution deposition can be used. After liquid depositing the ARC 16, a post deposition baking step is typically, but not necessarily always, required to remove unwanted components, such as solvent, and to effect crosslinking. When performed, the baking step is conducted at a temperature from about 60° to about 400° C., with a baking temperature from about 80° to about 300° C. being even more preferred. The duration of the baking step varies and is not critical to the practice of the present invention. The as-deposited ARC 16 may further undergo a curing process. The curing is performed in the present invention by a thermal cure, an electron beam cure, an ultra-violet (UV) cure, an ion beam cure, a plasma cure, a microwave cure or any combination thereof.

In addition, the composition of the starting precursor used in liquid deposition as well as the introduction of oxygen, nitrogen, fluorine containing precursors also allows the tunability of these films.

In either embodiment mentioned above, the ARC's optical constants are defined here as the index of refraction n and the extinction coefficient k. In general, ARC 16 can be modeled so as to find optimum optical parameters (n and k values) of ARC as well as optimum thickness. As mentioned above, the preferred optical constants of the ARC 16 are in the range from about n=1.4 to n=2.6 and k=0.01 to k=0.78 at a wavelength of 248, 193 and 157, 126 nm and extreme ultraviolet (13.4 nm) radiation.

In addition to the above, the ARC 16 does not interact with the patternable low-k material to induce residue, footing or undercutting. Moreover, the ARC 16 has good etch selectivity to the patternable dielectric material. Etch selectivities of 1.5-4 to 1 of the ARC to low-k dielectric material can be obtained. Furthermore, the use of the ARC 16 of described above (vapor or liquid deposited) maintains the pattern and structural integrity after curing of the patternable low-k material. This is critical as the ARC layer 16 is retained as a permanent part of the final interconnect stack.

Figure 1B:
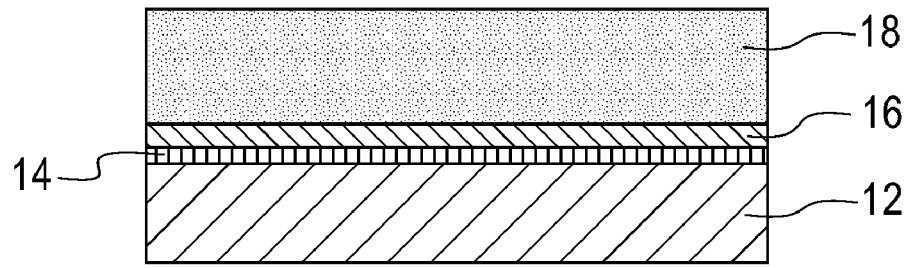

Next, and as illustrated in FIG. 1B, a first patternable low-k material 18, which combines the function of a photoresist and low-k material into one single material is provided. As shown, the first patternable low-k material 18 is provided directly on the surface of the ARC 16.

The first patternable low-k material 18 is provided (i.e., formed) utilizing a conventional deposition process including, for example, spin-on-coating, spray coating, dip coating, brush coating, and evaporation. After applying the first patternable low-k material 18, a post deposition baking step is typically, but not necessarily always, required to remove unwanted components, such as solvent. When performed, the baking step is conducted at a temperature from about 60° to about 200° C., with a baking temperature from about 80° to about 140° C. being even more preferred. The duration of the baking step varies and is not critical to the practice of the present invention.

The thickness of the first patternable low-k material 18 may vary depending on the technique used to form the same as well as the material make-up of the layer. Typically, the first patternable low-k material 18 has a thickness from about 10 to about 10000 nm, with a thickness from about 50 to about 2000 nm being more typical.

As stated above, the first patternable low-k material 18 functions as a photoresist and is converted into a low-k material during post patterning processing, by heat, UV light, electron beam, ion beam, microwave, plasma cure, or combinations thereof. For instance, the first patternable low-k material 18 may comprise a functionalized polymer having one or more acid-sensitive imageable groups. These polymers or blends of polymers can be converted into low-k materials after subsequent processing.

More specifically, the first patternable low-k material 18 comprises photo/acid-sensitive polymers of hydrocarbons, fluorinated hydrocarbons, siloxane, silane, carbosilane, oxycarbosilane, organosilicates, silsesquioxanes and the like. The polymers include, for example, silsesquioxane-type polymers including caged, linear, branched or combinations thereof. In one embodiment, the first patternable dielectric material 18 comprises a blend of these photo/acid-sensitive polymers. The first patternable dielectric material 18 may further comprises at least one sacrificial pore generator to reduce the dielectric constant in its cured form. Examples of patternable dielectric materials useable with the present disclosure are disclosed in U.S. Pat. Nos. 7,041,748, 7,056,840, and 6,087,064, all of which are incorporated herein by reference in their entirety. The dielectric constant of the patternable low-k material 18 after cure is generally no more than 4.3. The dielectric constant may be greater than 1 and up to about 4.3, more preferably from about 1 to about 3.6, even more preferably from about 1 to about 3.0, further more preferably from about 1 to about 2.5, with from about 1 to about 2.0 being most preferred.

The first patternable low-k material 18 is formed from a composition that includes one of the above mentioned polymers or polymer blends, a photoacid generator, a base additive and a solvent typically used in a photoresist. The photoacid generators, base additives and solvents are well known to those skilled in the art and, as such, details regarding those components are not fully provided.

In a preferred embodiment, the first patternable low-k material 18 is a negative-tone patternable low-k material comprising a silsesquioxane polymer or copolymer including, for example, poly(methylsilsesquioxane) (PMS), poly(p-hydroxybenzylsilsesquioxane) (PHBS), poly(p-hydroxyphenylethylsilsesquioxane) (PHPES), poly(p-hydroxyphenylethylsilsesquioxane-co-p-hydroxy-alpha-methylbenzyl silsesquioxane) (PHPE/HMBS), poly(p-hydroxyphenylethylsilsesquioxane-co-methoxybenzylsilsesquioxane) (PHPE/MBS), poly(p-hydroxyphenylethylsilsesquioxane-co-t-butylsilsesquioxane) (PHPE/BS), poly(p-hydroxyphenylethylsilsesquioxane-co-cyclohexylsilsesquioxane) (PHPE/CHS), poly(p-hydroxyphenylethylsilsesquioxane-co-phenylsilsesquioxane) (PHPE/PS), poly(p-hydroxyphenylethylsilsesquioxane-co-bicycloheptylsilsesquioxane) (PHPE/BHS), poly(p-hydroxy-alpha-methylbenzylsilsesquioxane) (PHMBS), poly(p-hydroxy-alpha-methylbenzylsilsesquioxane-co-p-hydroxybenzylsilsesquioxane) (PHMB/HBS), poly(p-hydroxy-alpha-methylbenzysilsesquioxane-co-methoxybenzylsilsesquioxane) (PHMB/MBS), poly(p-hydroxy-alpha-methylbenzylsilsesquioxane-co-t-butylsilsesquioxane) (PHMB/BS), poly(p-hydroxy-alpha-methylbenzylsilsesquioxane-co-cyclohexylsilsesquioxane) (PHMB/CHS), poly(p-hydroxy-alpha-metthylbenzylsilsesquioxane-co-penylsilsesquioxane) (PHMB/PS), poly(p-hydroxy-alpha-methylbenzylsilsesquoxane-co-bicycloheptylsilsesquioxane) (PHMB/BHS), poly(p-hydroxybenzylsilsesquioxane-co-p-hydroxyphenylethylsilsesquioxane) (PHB/HPES), and poly (p-hydroxy-alpha-methylbenzylsilsesquioxane-co-p-alpha-methylbenzylsilsesquioxane) (PHMB/MBS).

In the compositions containing a blended polymer component, the silsesquioxane polymer in the blend may be selected from the silsesquioxane polymers described above or may be selected from other silsesquioxane polymers such as, for example, poly(methyl-silsesquioxane) (PMS), poly(p-hydroxybenzylsilsesquioxane) (PHBS), poly(p-hydroxybenzylsilsesquioxane-co-methoxybenzylsilsesquioxane) (PHB/MBS), polyp-hydroxy-alpha-methylbenzylsilsesquioxane-co-p-alpha-methylbenzylsilsesquioxane) (PHMB/MBS), poly(p-hydroxybenzylsilsesquioxane-co-t-butylsilsesquioxane) (PHB/BS), poly(p-hydroxybenzylsilsesquioxane-co-cyclohexylsilsesquioxane) (PHB/CHS), poly(p-hydrooxybenzylsilsesquioxane-co-phenylsilsesquioxane) (PHB/PS), poly(p-hydroxybenzylsilsesquioxane-co-bicycloheptylsilsesquioxane) (PHB/BHS), and caged silsesquioxanes such as octakis(glycidyloxypropyl)dimethylsilyloxy)silsesquioxane, octakis[cyclohexenyl epoxide) dimethylsilyloxy]silsesquioxane, octakis[4-(hydroxyphenylethyl) dimethylsilyloxy]silsesquioxane, and octakis[{2-(1',1'-bis(trifluoromethyl)-1'-hydroxyethyl)norbornyl}dimethylsilyloxy]silsesquioxane. If desired, a combination of different silsesquioxane polymers may be used in the blend with the non-silsesquioxane polymer.

For positive tone patternable low-k material, the silicon-containing polymer employed in the present invention may be a homopolymer or a copolymer. Suitable types of such silicon-containing polymers include homopolymers or copolymers containing at least one monomer selected from the group consisting of a siloxane, a silane, a silsesquioxane and a silyne. Highly preferred silicon-backbone polymers are selected from the group consisting of poly(hydroxyphenyl alkyl)silsesquioxanes and poly(hydroxyphenyl alkyl) siloxanes, wherein the alkyl is a $C_{1-30}$ moiety. These preferred silicon-containing polymers are preferably fully or partially protected with acid-sensitive protecting groups.

The positive-tone patternable low-k material may comprise blends of a non-silicon containing polymer and a silicon-containing polymeric additive with a silicon-containing substituent bonded to the polymeric backbone, the silicon-containing polymeric additive may be a homopolymer or copolymer containing at least one monomer having a silicon-containing substituent. The silicon-containing substituent may or may not be acid sensitive. Typically, however the substituent is acid sensitive when containing a $C_2$ alkyl moiety. Preferably, the silicon-containing substituent is attached to a monomer selected from the group consisting of hydroxystyrene, an acrylate, a methacrylate, an acrylamide, a methacrylamide, itaconate, an itaconic half ester or a cycloolefin. Preferred silicon-containing substituents include: siloxane, silane and cubic silsesquioxanes. The silicon-containing polymer may further include silicon-free monomers such as those selected from the group consisting of styrene, hydroxystyrene, acrylic acid, methacrylic acid, itaconic acid and an anhydride such as maleic anhydride and itaconic anhydride.

Preferred monomers containing silicon-containing substituents are trimethylsilyl alkyl acrylate, trimethylsilyl alkyl methacrylate, trimethylsilyl alkyl itaconate, tris(trimethylsilyl)silyl alkyl acrylate tris(trimethylsilyl)silyl alkyl methacrylate, tris(trimethylsilyl)silyl alkyl itaconate, tris(trimethylsilyloxy)silyl alkyl acrylate, tris(trimethylsilyloxy)silyl alkyl methacrylate, tris(trimethylsilyloxy)silyl alkyl itaconate, alkylsilyl styrene, trimethylsilylmethyl(dimethoxy)silyloxy alkyl acrylate, trimethylsilymethyl(dimethoxy)silyloxy alkyl methacrylate, trimethylsilylmethyl(dimethoxy)silyloxy alkyl itaconate, trimethylsilyl alkyl norbornene-5-carboxylate alkyl, tris(trimethylsilyl)silyl alkyl norbornene-5-carboxylate and tris(trimethylsilyloxy)silyl alkyl norbornene-5-carboxylate, wherein alkyl is a $C_{1-5}$ moiety.

Highly preferred species of these monomers are 3-(3,5,7,9,11,13,15-heptacyclopentylpentacyclo[9.5.1.13,9.15,15.17,13]-octasiloxan-1-yl)propyl methacrylate, 1,3,5,7,9,11,13-heptacyclopentyl-15-vinylpentacyclo[9.5.1.13,9.15,15.17,13]octasiloxane methacrylamidotrimethylsilane, O-(methacryloxyethyl)-N-(triethoxysilylpropyl)urethane, methacryloxyethoxytrimethylsilane, N-(3-methacryloxy-2-hydroxypropyl)-3-aminopropyltriethoxysilane, (methacryloxymethyl)bis(trimethylsiloxy)methylsilane, (m,p-vinylbenzyloxy)trimethylsilane, methacryloxypropyltris(trimethylsiloxy)silane, methacryloxytrimethylsilane, 3-methacryloxypropylbis(trimethylsiloxy)methylsilane, 3-methacryloxypropyldimethylchlorosilane, methacryloxypropyldimethylethoxysilane, methacryloxypropyldimethylmethoxysilane, metbacryloxypropylheptacyclopentyl-T8-silsequioxane, methacryloxypropylmethyldichlorosilane, methaeryloxypropylmethyldiethoxysilane, methacryloxypropylmethyldimethoxysilane, (methacryloxymethyl)dimethylethoxysilane, (methacryloxymethyl)phenyldimethylsiane(phenyldimethylsilyl) methylmethacrylate, methacryloxymethyltriethoxysilane, methacryloxymethyltrimethoxysilane, methaeryloxymethyltris(trimethylsiloxy)silane, O-methacryloxy(polyethyleneoxy)trimethylsilane, methacryloxypropylpentamethyldisiloxane, methacryloxypropylsilatrane, methacryloxypropylsiloxane macromer, methaeryloxypropyl terminated polydimethylsiloxane, methacryloxypropyltrichlorosilane, methacryloxypropyltriethoxysilane, methacryloxypropyltrimethoxysilane, methacryloxypropyltris(methoxyethoxy)silane, p-(t-butyldimethylsiloxy)styrene, butenyltriethoxysilane, 3-butenyltrimethylsilane, (3-acryloxypropyl)trimethoxysilane, (3-acryloxypropyl)tris(trimethylsiloxy)silane, O-(trimethylsilyl)acrylate, 2-trimethylsiloxyethlacrylate, N-(3-acryloxy-2-hydroxypropyl)-3-aminopropyltriethoxysilane, (3-acryloxypropyl)dimethylmethoxysilane, (3-acryloxypropyl)methylbis(trimethylsiloxy)silane, (3-acryloxypropyl)methyldichlorosilane, and (3-acryloxypropyl)methyldimethoxysilane, (3-acryloxypropyl)trichlorosilane.

The extent of protection and the amount of co-monomer present in the silicon containing polymeric additive are such that the patternable low-k material resist composition will provide good lithography performance, i.e., high resolution and good process window. Examples of protecting groups which can be employed are cyclic and branched (secondary and tertiary) aliphatic carbonyls, esters or ethers containing from 3 to 30 carbon atoms, acetals, ketals and aliphatic silylethers.

Examples of cyclic or branched aliphatic carbonyls that may be employed in the present invention include, but are not limited to: phenolic carbonates; t-alkoxycarbonyloxys such as t-butoxylcarbonyloxy and isopropyloxycarbonyloxy. A highly preferred carbonate is t-butoxylcarbonyloxy.

Some examples of cyclic and branched ethers that may be employed in the present invention include, but are not limited to: benzyl ether and t-alkyl ethers such t-butyl ether. Of the aforesaid ethers, it is highly preferred to use t-butyl ether.

Examples of cyclic and branched esters that can be employed in the present invention are carboxylic esters having a cyclic or branched aliphatic substituent such as t-butyl ester, isobornyl ester, 2-methyl-2-admantyl ester, benzyl ester, 3-oxocyclohexanyl ester, dimethylpropylmethyl ester, mevalonic lactonyl ester, 3-hydroxy-g-butyrolactonyl ester, 3-methyl-g-butylrolactonyl ester, bis(trimethylsilyl)isopropyl ester, trimethylsilylethyl ester, tris(trimethylsilyl)silylethyl ester and cumyl ester.

Some examples of acetals and ketals that can be employed in the present invention include, but are not limited to: phenolic acetals and ketals as well as tetrahydrofuranyl, tetrahydropyranyl, 2-ethoxyethyl, methoxycyclohexanyl, methoxycyclopentanyl, cyclohexanyloxyethyl, ethoxycyclopentanyl, ethoxycyclohexanyl, methoxycycloheptanyl and ethoxycycloheptanyl. Of these, it is preferred that a methoxycyclohexanyl ketal be employed.

Illustrative examples of silylethers that can be employed in the present invention include, but are not limited to: trimethylsilylether, dimethylethylsilylether and dimethylpropylsilylether. Of these silylethers, it is preferred that trimethylsilylether be employed.

In a preferred embodiment for negative-tone patternable low-k materials of the present invention are two miscible, or compatible, silsesquioxanes. The first silsesquioxane polymer is a linear, branched, caged compound or combination thereof having the following structural formula:

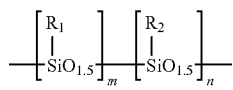

wherein each occurrence of $R_1$ is one or more acidic functional groups for base solubility; each occurrence of $R_2$ is a carbon functionality for controlling polymer dissolution in an aqueous base; $R_1$ is not equal to $R_2$; m and n represent the number of repeating units; m is an integer; and n is zero or an integer greater than zero. In the present invention, $R_1$ is not limited to any specific functional group, and is preferably selected from among linear or branched alkyls which are substituted with OH, C(O)OH, and/or F; cycloalkyls which are substituted with OH, C(O)OH, and/or F; aromatics which are substituted with OH, C(O)OH, and/or F; arenes that are substituted with OH, C(O)OH, and/or F; and acrylics which are substituted with OH, C(O)OH, and/or F.

Examples of preferred $R_1$ include:

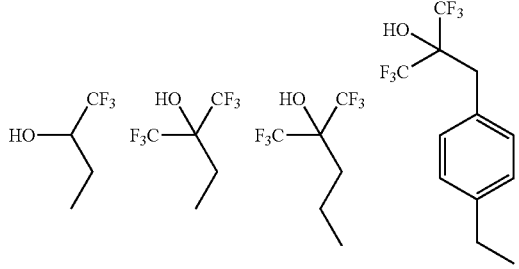

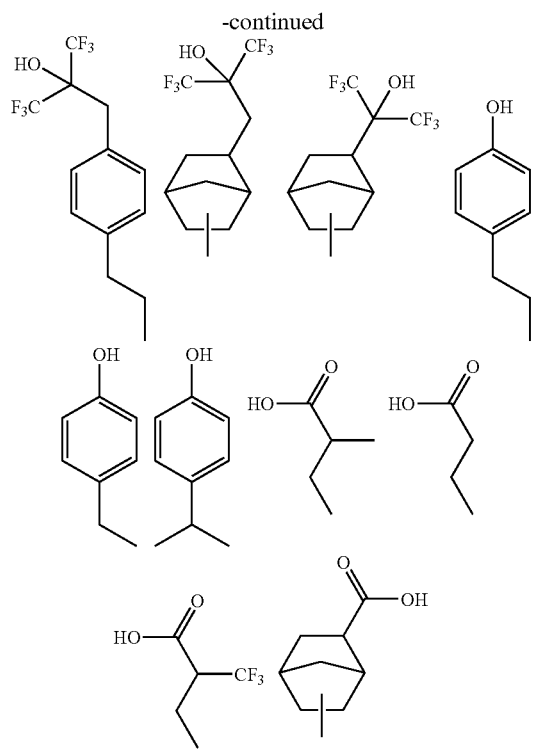

In the present invention, $R_2$ is not limited to any specific carbon functional group, and is preferably selected from among linear or branched alkyls, cylcoalkyls, aromatics, arenes, and acrylates.

The silsesquioxane polymers of the present invention have a weight averaged molecular weight of about 400 to about 500,000, and more preferable from about 1500 to about 10,000. The $R_1$ and $R_2$ proportions and structures are selected to provide a material suitable for photolithographic processes and maintaining pattern fidelity after post patterning cure.

A second polymer component of the blend material includes but is not limited to a family of organosilicates known as silsesquioxanes, having the structural formula:

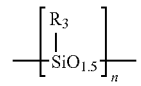

wherein $R_3$ is preferable selected from alkyls, cycloalkyls, aryl, or a combination thereof, and are commercially available from Dow Corning, Shin-Etsu, or JSR, for example. The silsesquioxane is preferably poly(methylsilsesquioxane), and n is an integer about 10 to about 1,000 or more (including copolymers). The silsesquioxane polymers possess silanol end groups, but may also include halosilanes, acetoxysilanes, silylamines, and alkoxysilanes. In a preferred embodiment of the present invention, silsesquioxane polymers, LKD-2021 or LKD-2056 (from JSR Corporation) which contain silanol end groups are employed.

The composition of the silsesquioxane polymers in the blend formulation is 1 to 99% of the total polymer composition. In the preferred embodiment of the invention, the composition of the acid sensitive polymer is 20 to 80% of the total polymer composition, and even more preferred, 30 to 60%.

A third component of the patternable low-k composition of the present invention is a pore-generating compound, called a porogen. The porogen provides nanoscopic pores in the composition of matter of the present invention which further reduces the dielectric constant of the material.

The porogen that can be used in the present invention includes miscible or phase separated, i.e., non-miscible, polymers that are capable of decomposing under heat or radiation. Alternatively, the porogen may be extracted with supercritical fluid techniques. Examples of porogens that may be employed in the present invention include: homopolymers, copolymers, organic nanoscopic polymers, thermoplastic polymers, star-shaped polymers, dendrimers or crosslinked polymers that remain substantially dormant during the patterning process. After patterning, the pore generating polymers are decomposed or extracted to enhance the dielectric properties of the material of the present invention without severely degrading the pattern fidelity. The decomposition of the porogen may be by heat or radiation-induced.

When a porogen is employed, it is present in the composition of the present invention in an amount of from about 0.1 to about 99.9% of the functionalized polymer. More preferably, the porogen is present in an amount of from about 5 to about 90% of the functionalized polymer.

A fourth component of the present invention is a photosensitive acid generator (PAG) that is compatible with the other components. Examples of preferred PAGs include: -(trifluoro-methylsulfonyloxy)-bicyclo[2.2.1]hept-5-ene-2,3-dicarboximide (MDT), onium salts, aromatic diazonium salts, sulfonium salts, diaryliodonium salts, and sulfonic acid esters of N-hydroxyamides or -imides, as disclosed in U.S. Pat. No. 4,371,605. The content of the '605 patent is incorporated herein by reference. A weaker acid generated from a PAG such as N-hydroxy-naphthalimide (DDSN) may be used. Combinations of PAGs may be used.

Condensation in the presence of an acid generated by a photoacid generator under exposure to radiation is not limited to silanols, but may also include halosilanes, acetoxysilanes, silylamines, and alkoxysilanes. Organic crosslinking agents, such as methylphenyltetramethoxymethyl glycouril (methylphenyl powderlink), may also be included in the formulation. Although photoacid generators are preferred for crosslinking, photobase generators can also be used for crosslinking silanol polymers.

The patternable low-k material of the present invention also includes a casting solvent to dissolve the other components. Examples of suitable casting solvent include and is not limited to ethoxyethylpropionate (EEP), a combination of EEP and γ-butyrolactone, propylene-glycol monomethyl-ether alcohol and acetate, propyleneglycol monopropyl alcohol and acetate, and ethyl lactate. Combinations of these solvents may also be used.

In optimizing the photolithography process, an organic base may be added to the formulation. The base employed in the present invention may be any suitable base known in the resist art. Examples of bases include tetraalkylammonium hydroxides, cetyltrimethylammonium hydroxide, and 1,8-diaminonaphthalene. The compositions of the present invention are not limited to any specific selection of base.

The term "acid-sensitive" is used throughout the application to denote imageable functional groups which undergo a chemical reaction in the presence of an acid generated by a photoacid generator under exposure to radiation. The acid-sensitive imageable functional groups employed in the present invention may include acid-sensitive positive-tone functional groups or acid-sensitive negative-tone functional groups The negative-tone acid-sensitive functional groups are functional groups for causing a crosslinking reaction which causes the exposed areas to be insoluble in a developer to form a negative-tone relief image after development. The positive-tone acid-sensitive functional groups are acid-sensitive protecting groups which cause the exposed region to be soluble in a developer to form positive-tone relief images after development.

The aforementioned patternable low-k materials act as a photoresist using patterning; they can be positive-tone or negative-tone, and sensitive to G-line, I-line, DUV (248 nm, 193 nm, 157 nm, 126 nm, and EUV (13.4 μm).

Next, the first patternable low-k dielectric material 18 is pattern-wise exposed to form latent images of a desired circuitry. An optional post-exposure baking may be required to effect the photochemical reactions. When performed, the baking step is conducted at a temperature from about 60° to about 200° C., with a baking temperature from about 80° to about 140° C. being even more preferred. The duration of the baking step varies and is not critical to the practice of the present invention. After exposure and post-exposure baking, the latent images are developed into the low-k material with an appropriate developer, usually an aqueous base solution, such as 0.26N tetramethylammoniahydroxide (TMAH) solution.

The pattern-wise exposing process can be accomplished in a variety of ways, including, for example, through a mask with a lithography stepper or a scanner with an exposure light source of G-line, I-line (365 nm), DUV (248 mm, 193 nm, 157 nm, 126 nm), Extreme UV (13.4 nm), or an electron beam, an ion beam. The pattern-wise exposing process also includes direct writing without the use of a mask with, for example, light, electron beam, ion beam, and scanning probe lithography.

Figure 1C:
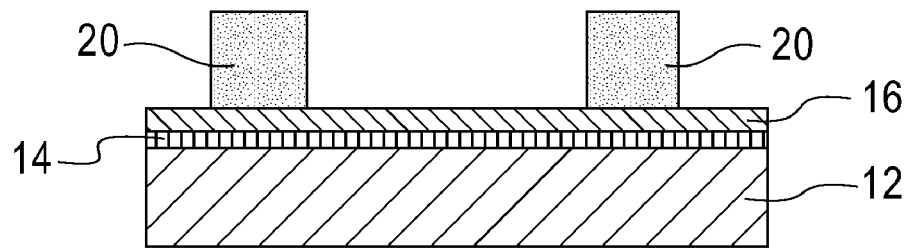
Figure 1D:
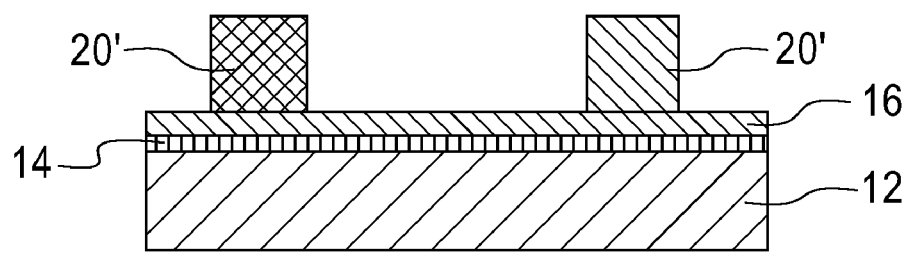

FIG. 1C illustrates the structure that is formed after forming a first pattern within the first patternable low-k dielectric material 18. Reference numeral 20 denotes the remaining first patternable low material which is not removed during the patterning process. As shown the remaining first patternable low-k dielectric material (or patterned first low-k dielectric material) 20 protects portions of the ARC 16, while other portions of the ARC 16 are left exposed.

After forming the patterned first low-k dielectric material 20, the low-k material is typically, but not necessarily always, cured to form a cured patterned first low-k material 20'(See, FIG. 1D) in which the cured low-k material typically has Si atoms that are bonded to cyclic rings (aliphatic or aromatic) through oxygen atoms. This type of bonding is evident from $C^{13}$NMR or $^{29}$Si NMR. The curing is optional when the first patternable low-k material is negative-tone, but it is required when the first patternable low-k material is a positive-tone material.

Curing is performed in the present invention by a thermal cure, an electron beam cure, an ultra-violet (UV) cure, an ion beam cure, a plasma cure, a microwave cure or a combination thereof. The conditions for each of the curing process are well known to those skilled in the art and any condition can be chosen as long as it coverts the patternable low-k material into a low-k film and maintains pattern fidelity.

In another embodiment, the irradiation cure step is performed by a combination of a thermal cure and an ultra-violet (UV) cure wherein the wavelength of the ultra-violet (UV) light is from about 50 to about 300 nm and the light source for the ultra-violet (UV) cure is a UV lamp, an excimer (exciplex) laser or a combination thereof.

The excimer laser may be generated from at least one of the excimers selected from the group consisting of $Ar_2^*$, $Kr_2^*$, $F_2$, $Xe_2^*$, ArF, KrF, XeBr, XeCl, XeCl, XeF, $CaF_2$, KrCl, and Cl$_2$ wherein the wavelength of the excimer laser is in the range from about 50 to about 300 nm. Additionally, the light of the ultra-violet (UV) cure may be enhanced and/or diffused with a lens or other optical diffusing device known to those skilled in the art.

In one embodiment, this post patterning cure is a combined UV/thermal cure. This combined UV/thermal cure is carried on a UV/thermal cure module under vacuum or inert atmosphere, such as N$_2$, He, Ar. Typically, the UV/thermal cure temperature is from about 100° C. to about 500° C., with a cure temperature from about 300° to about 450° C. being more typical. The duration of the UV/thermal cure is from about 0.5 min to about 30 min with a duration from about 1 to about 10 min being more typical. The UV cure module is designed to have a very low oxygen content to avoid degradation of the resultant dielectric materials.

Figure 1E:
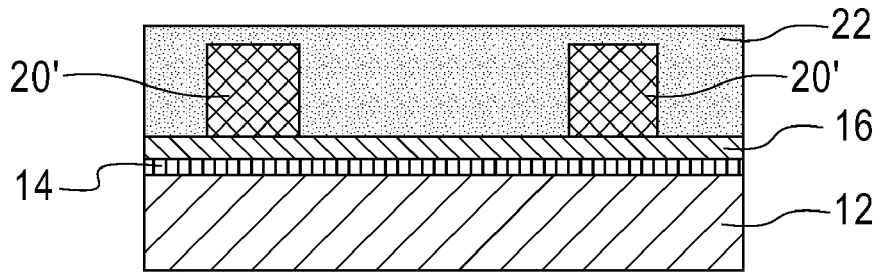

After patterning and optionally curing the first patternable low-k material 18, a second patternable low-k material 22 is then formed providing the structure shown in FIG. 1E. The second patternable low-k material 22 may comprise the same or different material as the first patternable low-k material 18. The deposition processes and thickness mentioned above for the first patternable low-k material 18 are each applicable here for the second patternable low-k material 22. Typically, and in the embodiment illustrated, the first patternable low-k material 18 or the second low-k material 22 is either a negative-tone or a positive-tone material.

Figure 1F:
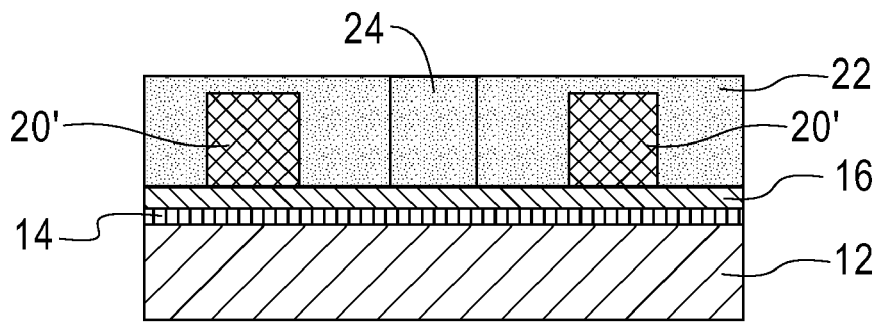

Next, and as shown in FIG. 1F, the second patternable low-k dielectric material 22 is subjected to an exposure step in which the exposure of the second patternable low-k dielectric material 22 occurs in an area different from the patterned low k dielectric material that remains on the surface of ARC 16. Typically, this exposure occurs at a half pitch distance from the edge of the patterned first low-k dielectric material. In FIG. 1F, the area within the second patternable low-k dielectric material 22 which is denoted by reference numeral 24 denotes the exposed area.

Figure 1G:
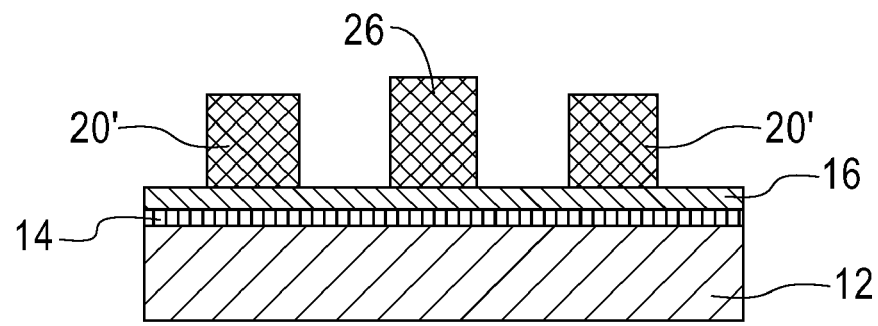
Figure 1H:
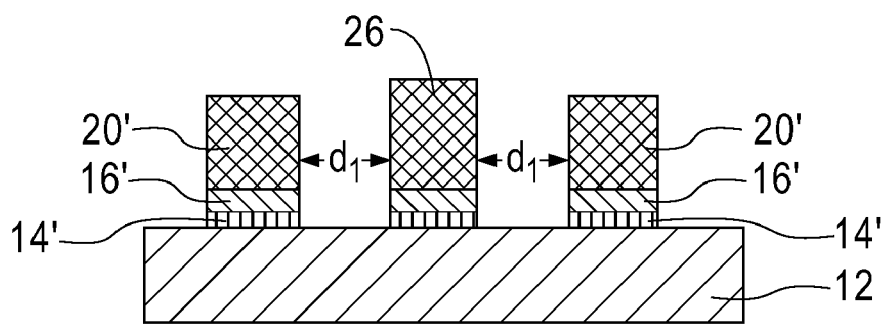

FIG. 1G illustrates the structure of FIG. 1F after further patterning (i.e., development) and curing. The further patterning forms a patterned second low k dielectric material on a previous surface on the ARC 16 which does not include the patterned first low-k dielectric material 20. In FIG. 1G, reference numeral 26 denotes the patterned and cured second low-k dielectric material. The further patterning of the second patternable low-dielectric material 22 is performed utilizing the same basic processing equipment and steps as those used for patterning the first patternable low-k dielectric material. Curing is also performed as described above. If the patterned first low k dielectric material was not previously cured, the curing step used at this point of the inventive process would cure both the patterned first and second low-k dielectric materials. In the illustrated embodiment, the patterned second low-k dielectric has a surface whose height is greater than the height of the adjacent patterned low-k dielectric material. Variation to the size and shapes of the resultant patterned low-k dielectric can be obtained and is within the knowledge of those skilled in the art.

Like the first cured low-k material, the cured and patterned second low-k material 20 has a dielectric constant within the ranges mentioned above and it also is characterized as typically having Si atoms bonding to cyclic rings (aliphatic or aromatic) via oxygen atoms.

After providing the structure shown in FIG. 1G, the pattern provided by the patterned first and second low-k dielectric materials is transferred into at least the underlying ARC 16 and optional dielectric cap 14, if present. The resultant structure that is formed after performing pattern transfer forming patterned ARC 16' and optionally patterned dielectric cap 14' is shown, for example, in FIG. 1H. The pattern transfer is achieved by utilizing one or more etching steps. The one or more etching steps may include dry etching (i.e., reactive-ion etching, ion beam etching, or laser etching), wet etching (i.e., using a suitable chemical etchant) or any combination thereof. Typically, a dry etching process such as reactive ion etching is employed. The distance d, between the first patterned feature and the second pattern feature is roughly half of the distance of similar features with one single exposure patterning. A third, forth, etc patterning can be conceived to further improve resolution by repeating the second patterning process described above.

At this point of the present invention, further semiconductor processing can be performed to compete the fabrication of a desired structure or device. For example, further interconnect processing can be used, such a formation of a diffusion barrier and deposition of a conductive material can be performed to form an interconnect level of an interconnect structure.

Is it noted that the method of the present invention as illustrated in FIGS. 1A-1H enables high-resolution double patterning with a single material (i.e., a patternable low-k dielectric material). Moreover, the inventive process illustrated above simplified the double patterning film stack and process and also creates a fine permanent structure which includes the patternable low-k dielectric material in a patterned and cured state. Moreover, very small feature sizes can be obtained utilizing the inventive process.

While the present invention has been particularly shown and described with respect to preferred embodiments thereof it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method of forming a double patterned semiconductor structure comprising:
   forming a first patternable low-k dielectric material above a surface of a material stack;
   patterning said first patternable low-k dielectric material to provide a first structure having a first patterned low-k dielectric material above said surface of said material stack;
   forming a second patternable low-k dielectric material over said first structure and on an exposed upper surface of said material stack not including said first structure;
   patterning said second patternable low-k dielectric material to provide a second structure including a second patterned low-k dielectric material located atop a portion of said exposed upper surface of said material stack and adjacent to, but not abutting the first patterned low-k dielectric material;
   curing at least the second patterned low-k dielectric material;
   transferring patterns provided by said first and second patterned low-k dielectric materials into said material stack; and
   maintaining said first and second patterned low-k dielectric materials within the structure as permanent dielectric layers.

2. The method of claim 1 wherein said material stack is located on a substrate and includes at least an antireflective coating and optionally a dielectric cap.

3. The method of claim 2 wherein said antireflective coating is an inorganic antireflective coating formed by vapor deposition and includes atoms of M, C and H, wherein M is at least one of Si, Ge, B, Sn, Fe, Ta, Ti, Ni, Hf and La and, optionally, one of O, N, S and F.

4. The method of claim 2 wherein s said antireflective coating is an inorganic antireflective coating formed by liquid deposition and comprises a polymer that has at least one monomer unit having the formula $M-R^1$, wherein M is at least one of Si, Ge, B, Sn, Fe, Ta, Ti, Ni, Hf and La and, optionally, one of O, N, S and F, and R is a chromophore.

5. The method of claim 4 wherein said polymer further includes another monomer unit having the formula $M'-R^2$, wherein M' is at least one of Si, Ge, B, Sn, Fe, Ta, Ti, Ni, Hf and La and, optionally, one of O, N, S and F, and R is a cross-linking agent.

6. The method of claim 5 wherein at least one of M and M' is further bonded to an organic ligand of C and H, a cross-linking component, a chromophore or mixtures thereof 7. The method of claim 1 wherein said first and second patternable low-k dielectric materials are the same or different and are functionalized polymers having one or more irradiation/acid sensitive imageable groups.

8. The method of claim 7 wherein said functionalized polymers comprise polymers of a hydrocarbon, a fluorinated hydrocarbon, a siloxane, a silane, a carbosilane, an oxycarbosilane, an organosilicate or a silsesquioxane.

9. The method of claim 1 wherein at least one of said first and second patternable low-k dielectric materials further comprises a functionalized sacrificial pore generator.

10. The method of claim 1 wherein said curing comprises a thermal cure, an electron beam cure, an UV cure, an ion beam cure, a plasma cure, a microwave cure or any combination thereof.

11. The method of claim 1 wherein said first patterned low-k dielectric material is cured prior to forming said second patternable low-k dielectric material over said first structure.

12. The method of claim 1 wherein the patterning of said second patternable low-k dielectric material step is repeated at least one more time.

13. A method of forming a double patterned semiconductor structure comprising:
forming a first patternable low-k dielectric material above a surface of a material stack, said material stack including at least an inorganic antireflective coating;
patterning and curing said first patternable low-k dielectric material to provide a first structure having a first patterned and cured low-k dielectric material above said surface of said material stack;
forming a second patternable low-k dielectric material over said first structure and on an exposed upper surface of said material stack not including said first structure;
patterning said second patternable low-k dielectric material to provide a second structure including a second patterned low-k dielectric material located atop a portion of said exposed upper surface of said material stack and adjacent to, but not abutting the first patterned cured low-k dielectric material;
curing the second patterned low-k dielectric material;
transferring patterns provided by said first and second cured and patterned low-k dielectric materials into at least said inorganic antireflective coating; and
maintaining said first and second cured and patterned low-k dielectric materials within the structure as permanent dielectric layers.

14. The method of claim 13 wherein said inorganic antireflective coating is formed by vapor deposition and includes atoms of M, C and H, wherein M is at least one of Si, Ge, B, Sn, Fe, Ta, Ti, Ni, Hf and La and, optionally, one of O, N, S and F.

15. The method of claim 13 wherein said inorganic antireflective coating is formed by liquid deposition and comprises a polymer that has at least one monomer unit having the formula $M-R^1$, wherein M is at least one of Si, Ge, B, Sn, Fe, Ta, Ti, Ni, Hf and La and, optionally, one of O, N, S and F, and R is a chromophore.

16. The method of claim 15 wherein said polymer further includes another monomer unit having the formula $M'-R^2$, wherein M' is at least one of Si, Ge, B, Sn, Fe, Ta, Ti, Ni, Hf and La and, optionally, one of O, N, S and F, and R is a cross-linking agent.

17. The method of claim 16 wherein at least one of M and M' is further bonded to an organic ligand of C and H, a cross-linking component, a chromophore or mixtures thereof.

18. A double patterned semiconductor structure comprising:
a first patterned and cured low-k dielectric material located on a portion of an antireflective coating; and
a second patterned and cured low-k dielectric material located on another portion of said antireflective coating, wherein said second patterned and cured low-k dielectric material is adjacent to, but not abutting said first patterned and cured low-k dielectric material, wherein said inorganic antireflective coating is (i) a material having atoms of M, C and H, wherein M is at least one of Si, Ge, B, Sn, Fe, Ta, Ti, Ni, Hf and La, or (ii) a polymer that has at least one monomer unit having the formula $M-R^1$, wherein M is at least one of Si, Ge, B, Sn, Fe, Ta, Ti, Ni, Hf and La, and R is a chromophore, wherein said first and second patterned and cured low-k dielectric materials are permanent dielectric layers within the structure.

19. The double patterned semiconductor structure of claim 18 wherein said inorganic antireflective coating is said polymer, and said polymer further includes another monomer unit having the formula $M'-R^2$, wherein M' is at least one of Si, Ge, B, Sn, Fe, Ta, Ti, Ni, Hf and La and, optionally, one of O, N, S and F, and R is a cross-linking agent.

20. The double patterned semiconductor structure of claim 19 wherein at least one of M and M' is further bonded to an organic ligand of C and H, a cross-linking component, a chromophore or mixtures thereof 21. The double patterned semiconductor structure of claim 18 wherein said first and second cured and patternable low-k dielectric materials are the same or different and are functionalized polymers having one or more irradiation/acid sensitive imageable groups.

22. The double patterned semiconductor structure of claim 21 wherein said functionalized polymers comprise polymers of a hydrocarbon, a fluorinated hydrocarbon, a siloxane, a silane, a carbosilane, an oxycarbosilane, an organosilicate or a silsesquioxane.

23. The double patterned semiconductor structure of claim 18 wherein at least one of said first and second cured and patterned low-k dielectric materials is porous.

24. The double patterned semiconductor structure of claim 18 wherein said first and second cured and patterned low-k dielectric materials have a dielectric constant of not more than 4.3.

25. The double patterned semiconductor structure of claim 18 wherein said first and second cured and patterned low-k dielectric materials are separated by a distance that is roughly half of the distance of similar features with one single exposure patterning.

* * * * *